UNITED STATES PATENT OFFICE.

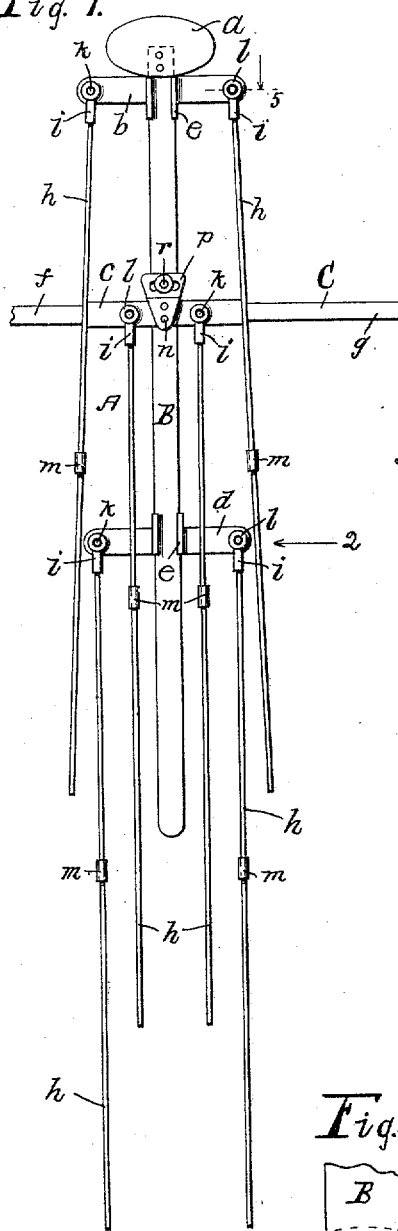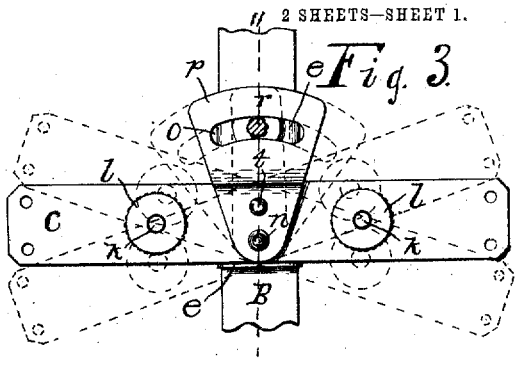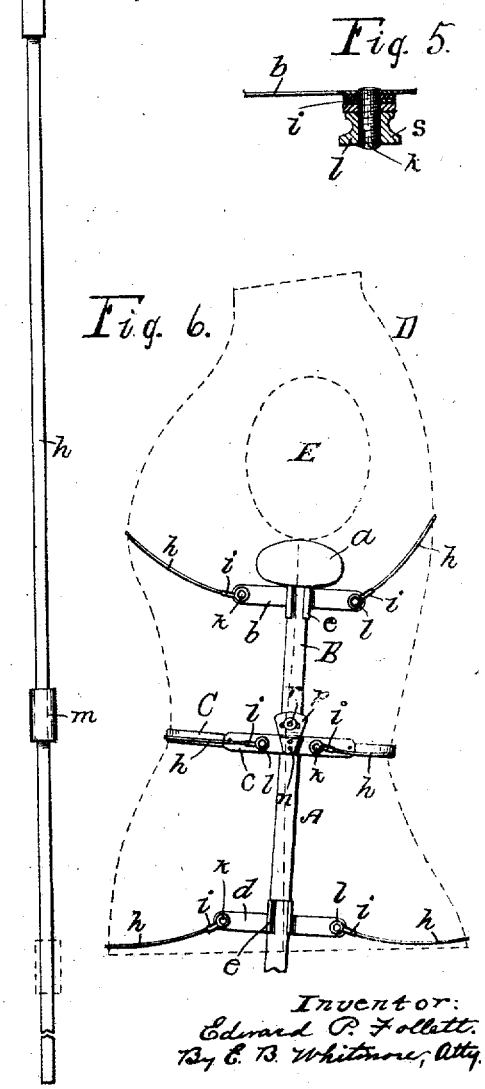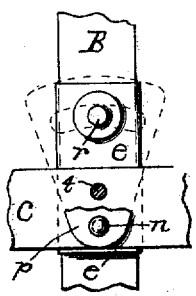

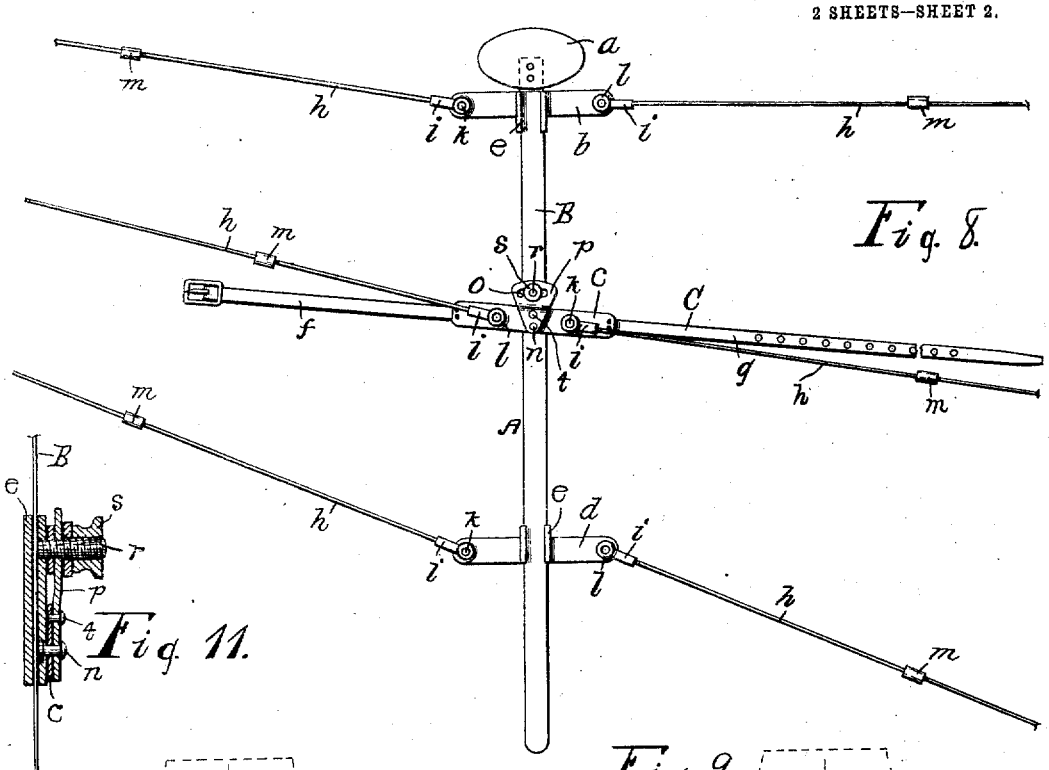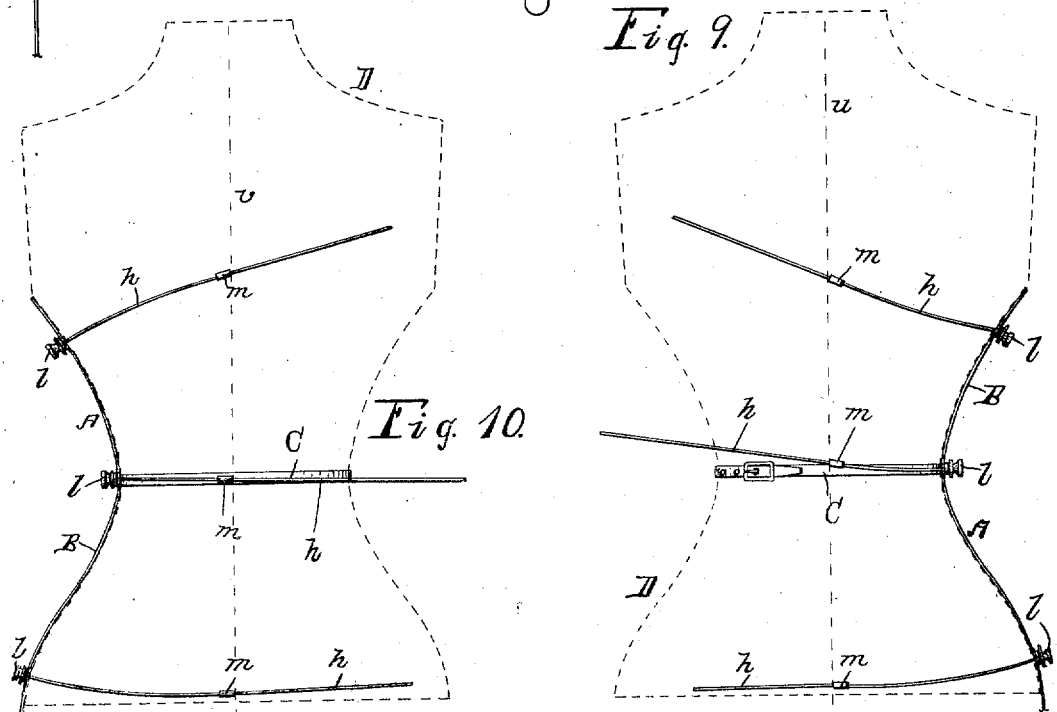

EDWARD P. FOLLETT, OF ROCHESTER, NEW YORK.

MEASURING DEVICE FOR CORSETS.

No. 808,233.      Specification of Letters Patent.      Patented Dec. 26, 1905.

Application filed December 28, 1904. Serial No. 238,674.

*To all whom it may concern:*

Be it known that I, EDWARD P. FOLLETT, of Rochester, in the county of Monroe and State of New York, have invented a new and useful Improvement in Measuring Devices for Corsets, which improvement is fully set forth in the following specification and shown in the accompanying drawings.

My invention is a device for taking measures for corsets, the same consisting of movable parts joined and adjustable one upon another, the device being designed to be placed temporarily upon the person to be fitted or upon an artificial form for the purpose of locating points and taking measures.

The invention is hereinafter fully described, and more particularly pointed out in the appended claims, reference being had to the accompanying drawings, which, with the reference characters marked thereon, form a part of this specification.

Figure 1 is a plan of the measuring device with parts of the belt broken away. Fig. 2 is an edge view seen as indicated by arrow 2 in Fig. 1, the belt being omitted. Fig. 3 is a plan of the swivel bar or head and some associated parts, parts of the body being broken away and other parts shown in various positions by full and by dotted lines. Fig. 4 is a plan of one of the measuring-arms detached. Fig. 5 shows a clamping-stud with associated parts sectioned on the axis of the stud. Fig. 6 shows a form in outline with the measuring device applied thereto. Fig. 7 shows parts appearing in Fig. 3 with the sector mainly broken away to uncover other parts. Fig. 8 shows the device opened out after having been applied to the form. Figs. 9 and 10 show, respectively, in outline the front and the back of a form, further showing the application of the measuring device. Fig. 11 is a longitudinal section of a portion of the body and associated parts on the dotted line 11 in Fig. 3. Figs. 2 to 7, inclusive, and Figs. 9, 10, and 11 are drawn to various scales, both larger and smaller than that of Figs. 1 and 8.

In the drawings, A is the measuring device as a whole, consisting of a metallic, flexible, and elastic body B, the same being preferably a thin strip of spring-steel, commonly formed with an expanded upper terminal $a$, of sheet metal. Upon the body B are placed a series of independent cross bars or heads $b$ $c$ $d$, adapted to move in longitudinal directions upon said body, each head being provided with a clasp $e$, folded upon the edges of the body B and holding to place thereon by friction and adapted to slide thereon. These heads are elongated transversely of the body, with ends or parts overhanging the sides of the body and usually equal in dimensions and flexible, being commonly made of pieces of the metal strip of which the body B is made. To the respective overhanging ends of the intermediate head $c$ are secured leather straps $f$ $g$, extending in opposite directions and, together with said head, constituting a belt C, to be passed around the waist of the person or the form being measured to hold the device in place thereon.

Each head $b$ $c$ $d$ is provided with a pair of slender flexible measuring-arms $h$, joined pivotally to the head and in such manner as to be adapted to swing in planes parallel with the plane of the body B. These measuring-arms are made of flexible metal, preferably thin strips of spring-steel, and formed with thickened perforated heads $i$, Fig. 4, to pass upon clamping studs or screws $k$, Fig. 5, rigid in the several heads, the arms being secured rigidly to place upon the respective heads by means of clamp-nuts $l$ on the respective studs $k$. The measuring-arms $h$ are each provided with an indicator $m$, the same being preferably a short band or ring of india-rubber adapted to slide along the arm and hold by friction securely to places of longitudinal adjustment thereon.

The intermediate head $c$ of the series holding the belt C is provided with an overlapping sheet-metal sector $p$, Figs. 1, 2, 3, 6, 7, 8, and 11, made rigid with the head by pins or fasteners $n$ $t$. The pin $n$ projects inwardly into the associated clasp $e$, as shown in Fig. 11, being rigid in the sector and the head, but turning freely in the clasp. By this means the head $c$ and the body B may have pivotal or swivel motions upon each other, as indicated by dotted lines in Fig. 3. The sector is formed at its upper broad end with a circular slot $o$, concentric with the pivot-pin $n$, forward through which slot a clamping-stud $r$, rigid with the associated clasp $e$, projects. The stud is provided at its outer free end with a clamp-nut $s$, as shown, by means of which the head $c$ and body B may be rigidly held in any relative position of pivotal adjustment.

In using this measuring device it is placed substantially in a vertical position against the left side of the person or the form D, with the part $a$ directly beneath the arm E, as appears in Fig. 6, and secured to place by the belt C, buckled around the waist. The upper head $b$ is commonly placed against the terminal $a$, though for low corsets it is shifted correspondingly below the part $a$, the heads $e$ $d$ being adjusted to the waist-line and to the hips, respectively. The measuring-arms $h$ of the upper head $b$ are then carried successively around front and back, the sliding indicators $m$ being shifted on the arms to have their advance ends coincide with the front and the rear middle vertical lines $u$ $v$, respectively, of the form D, as shown in Figs. 9 and 10. The arms are adjusted in positions of elevation to have the indicators $m$ indicate the top of the intended corset in front and at the back, respectively, and when each arm is thus brought accurately to place it is firmly clamped to the head $b$ by tightening its associated clamp-nut $l$ and then left to swing away from the form D in obedience to its elasticity. In a similar manner the arms $h$ of the heads $c$ and $d$, respectively, are carried successively around to place on the form D, front and rear, and secured by the associated clamp-nuts $l$, the various indicators $m$ being adjusted upon the arms to points at the middle of the waist-line and the middle of the hip-line, respectively, front and back, as in the former case, each arm being fixed in position on the associated head by its clamp-nut $l$. This being done, the device is removed from the person or the form, as the case may be, and laid flat upon a sheet of paper, with the measuring-arms $h$ stretched out as controlled by the various clamp-nuts, as appears in Fig. 7, and nine points—that is to say, one at each of the six indicators $m$ and one at the middle of each head $b$ $c$ $d$—marked on the paper, from which the corset is subsequently completed.

The provision in this invention for swivel motions of the body part B on the intermediate head $c$ enables the manufacturer to use the invention for producing corsets of different kinds and styles and to fit different forms by changing the position of inclination of said part B on the person or the form D. Regarding Fig. 6 it will be readily seen that after the belt C is secured around the waist the body B, with its incumbent parts, may be turned one way or the other on the pivot-pin $n$ to any desired inclination. If turned, for example, in a manner to carry the upper end back, the upper ends of the pieces going to make up the corset will be comparatively wide in front and narrow at the back, with their lower ends narrow in front and wider at the back, the seams generally inclining forward at their lower ends, and if the body B be turned to bring its upper end farther forward the pieces of the corset will have a reverse form—that is to say, they will be wide at the rear upper ends and the front lower ends and narrow at the front upper ends and the rear lower ends, the seams taking directions accordingly.

This measuring device is adapted for use in the matter of making corsets both for custom work and in quantities for the trade, artificial forms of approved shape being employed in the latter work upon which to strap the device.

It may be sometimes desirable to graduate the measuring-arms $h$ or mark them off in inches and fractions thereof if found convenient for doing any special kind of work.

What I claim as my invention, and desire to secure by Letters Patent, is—

1. A measuring device for corsets, comprising a flexible elongated body, a series of heads adapted to move in longitudinal directions on said body, flexible measuring-arms pivotally held by said heads, and frictionally-held yielding movable indicators on said measuring-arms, said arms being mounted upon opposite ends of said heads and upon opposite sides of said body.

2. A measuring device for corsets, having an elongated body, a series of heads with overhanging ends disposed transversely of said body and adapted to move in longitudinal directions thereon, a pair of flexible arms disposed upon opposite sides of the body and held pivotally one at either of said overhanging parts of each head, and frictionally-held yielding slidable indicators on said arms, one of said heads having pivotal motion relative with said elongated body.

3. A measuring device for corsets, having an elongated body, a series of three independent heads having clasps engaging said body, a metal slotted sector overlapping and rigid with the middle head of the series and pivotally connected with the associated clasp, a threaded stud of the clasp projecting through the slotted sector, and a clamp-nut on the stud to control the sector.

4. A measuring device for corsets comprising an elongated body, a series of independent heads adjustable on said body, means for permitting swivel motions of the body on the intermediate head, and a series of flexible measuring-arms pivotally mounted on said heads upon opposite sides of the body.

In witness whereof I have hereunto set my hand, this 24th day of December, 1904, in the presence of two subscribing witnesses.

EDWARD P. FOLLETT.

Witnesses:
 ENOS B. WHITMORE,
 MINNIE SMITH.